United States Patent [19]

Rice

[11] Patent Number: 4,642,271
[45] Date of Patent: Feb. 10, 1987

[54] BN COATING OF CERAMIC FIBERS FOR CERAMIC FIBER COMPOSITES

[75] Inventor: Roy W. Rice, Alexandria, Va.

[73] Assignee: The United States of America as represented by the Secretary of the Navy, Washington, D.C.

[21] Appl. No.: 700,246

[22] Filed: Feb. 11, 1985

[51] Int. Cl.⁴ .............................................. B32B 9/00
[52] U.S. Cl. .................................... 428/698; 428/367; 428/375; 428/378; 428/388; 428/902; 428/903; 501/95
[58] Field of Search ............... 428/375, 378, 388, 366, 428/367, 368, 370, 698, 903, 902; 501/5, 9, 95, 96, 102, 103, 134

[56] References Cited

U.S. PATENT DOCUMENTS

| 3,607,608 | 9/1971 | Siefert | 501/95 X |
|---|---|---|---|
| 3,668,059 | 6/1972 | Economy | 428/902 X |
| 3,702,240 | 11/1972 | Siefert | |
| 3,869,335 | 3/1975 | Siefert | |
| 4,341,965 | 7/1982 | Okuo et al. | 428/378 X |
| 4,373,006 | 2/1983 | Galasso et al. | |
| 4,481,257 | 11/1984 | Suplinskas et al. | 428/375 X |
| 4,543,345 | 9/1985 | Wei | 501/95 |
| 4,588,699 | 5/1986 | Brennan et al. | 428/698 X |
| 4,589,900 | 5/1986 | Brennan et al. | 428/698 X |

Primary Examiner—George F. Lesmes
Assistant Examiner—Susan S. Rucker
Attorney, Agent, or Firm—Sol Sheinbein; Stephen G. Mican

[57] ABSTRACT

A ceramic fiber composite material comprised of boron nitride coated ceramic fibers embedded in a ceramic matrix. The boron nitride coating limits both physical bonding and chemical reaction between the fibers and matrix to improve both strength and toughness of the composite material.

9 Claims, 6 Drawing Figures

BN COATING OF CERAMIC FIBERS FOR CERAMIC FIBER COMPOSITES

BACKGROUND OF THE INVENTION

The present invention relates to ceramic fiber composites, and more particularly to composites with coated ceramic fibers in a ceramic matrix.

Ceramic fiber composites have been attracting increasing interest primarily because of their high toughness levels (e.g., approximately 20 MPam$^{\frac{1}{2}}$) and frequent absence of catastrophic failure upon reaching their maximum load carrying capability. The high toughness of these composites has been characerically associated with limited bonding between the fibers and the matrix in order to give substantial fiber pull-out as a major source of toughening. On the other hand, brittle failure in unsuccessful composites and resultant flat fractures with essentially no fiber pull-out have been attributed to strong fiber-matrix bonding.

Good toughness characteristics can be introduced into composites with ceramic fibers and a ceramic matrix only when there is very limited bonding between the fibers and matrix. However, many possible combinations of such ceramic fiber composites result in strong bonding over most, if not all, of the range of practical processing conditions, thereby limiting the potential toughness ranges of these composites. Furthermore, many ceramic fibers will react chemically with a variety of possible ceramic matrixes, destroying or limiting both strength and toughness.

There are other important motivations for investigating coatings for fibers besides controlling fiber-matrix bonding. Fiber coatings can protect fibers from mechanical damage during handling and processing. They can also provide chemical protection from attack by the matrix during the processing. Coatings may also be of importance in limiting the oxidation embrittlement of ceramic fiber composites.

Coatings may be applied to the fibers to limit bonding and chemical reaction with the matrix if the coating has suitable coherence to the fibers. Prior art ceramic fiber composites with metal coated fibers, such as disclosed in U.S. Pat. No. 3,869,335, are suitable for low temperature processing and use environments, but not at elevated temperatures because of the relatively low melting point of the metal coatings.

OBJECTS OF THE INVENTION

Accordingly, one object of the invention is to secure high strength and toughness characteristics in a ceramic fiber composite having ceramic fibers and matrix.

Another object of the invention is to limit ceramic fiber bonding to a ceramic matrix in a ceramic fiber composite.

Yet another object of the invention is to limit fibermatrix chemical reactions in a ceramic fiber matrix.

A further object of the invention is to maintain superior strength and toughness characteristics in a ceramic fiber composite at elevated temperatures.

SUMMARY OF THE INVENTION

The present invention achieves these and other objects by fabricating a ceramic fiber composite comprising boron nitride coated ceramic fibers embedded in a ceramic matrix. The boron nitride coating maintains high coherence to the fibers, thereby limiting bonding and chemical reactions between the fibers and the ceramic matrix, so that excellent strength and toughness characteristics may be realized. The boron nitride coating remains stable at temperatures far higher than the melting point of metal coatings so that the superior strength and toughness characteristics are retained in high temperature process and use environments.

The foregoing, as well as other objects, features and advantages of the invention will be apparent from the following description of several embodiments of the invention, and the novel features will be particularly pointed out hereinafter in connection with the appended claims.

DESCRIPTION OF THE PREFERRED EMBODIMENT

Figure 1:
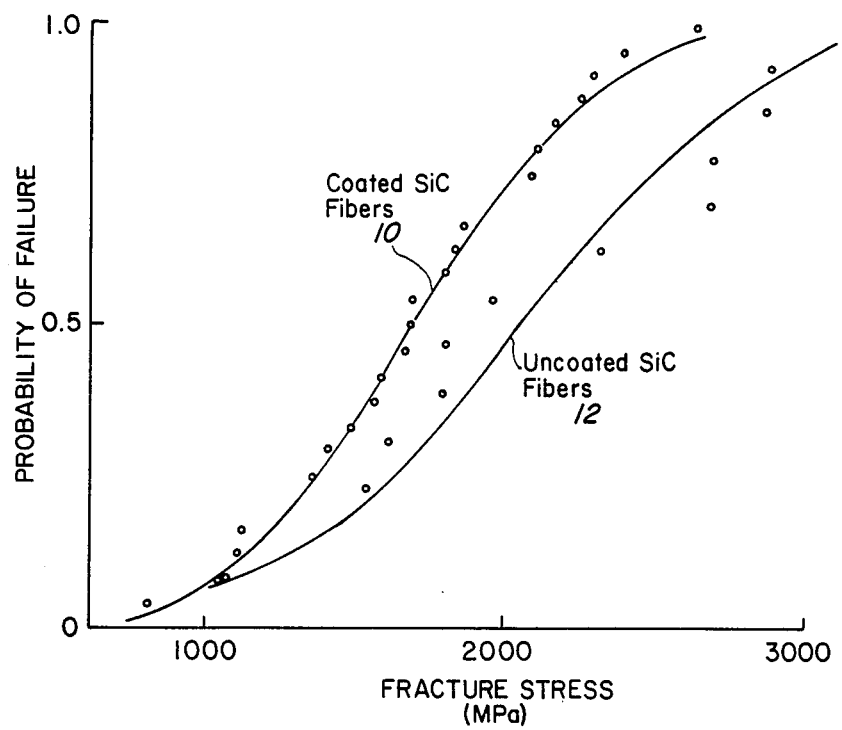
FIG. 1 is a graph showing the probability of failure as a function of fracture stress for SiC fibers with and without a BN coating according to the present invention.

The invention may be fabricated using well known chemical vapor deposition techniques. Any source of boron nitride may be used for the deposition process, such as boron tri-chloride and ammonia, but borazine is preferred because lower processing temperatures may be used.

Any temperature may be used for the boron nitride deposition process, but to best avoid fiber degradation, temperatures of less than 1000° C. are recommended. Using borazine as a source of boron nitride, a deposition temperature of 900° C. plus or minus 50° C. is preferred.

A wide variety of fiber compositions may be coated and embedded in a ceramic matrix according to the present invention with good results. Examples of such fiber compositions are SiC, Al$_2$O$_3$ and graphite.

The fibers used in the matrix according to the invention may range over a very large span of dimensions. Fibers ranging in size from single micron whiskers to strands 150 microns in diameter have been used according to the invention with success.

The thickness of the boron nitride coating may also vary over a broad range with good results. Coating thickness as thin as 0.05 micron and as thick as several tenths of a micron have been used according to the invention with success. The coating thickness used will depend upon a number of factors. A very thin coating, on the order of several angstroms, is adequate to prevent physical bonding between the fibers and matrix if the coating is sufficiently uniform. However, such thin coatings will allow chemical reactions to occur between the fibers and matrix.

Thick coatings will prevent both physical bonding and chemical reaction between the fibers and the matrix, but thick coatings are more expensive to apply and may have a detrimental effect on the strength of the final composite if the thickness of the coating is more than a small fraction of the fiber diameter.

A wide variety of ceramic matrix compositions may be used according to the present invention. Matrix compositions including SiC, $ZiO_2$, 96% $SiO_2$ with 4% $B_2O_3$, $ZrO_2$, Zr-$TiO_2$, mullite, cordierite and coated carbon have been used with success.

A proportion of at least 30 percent fiber by volume is recommended to be included in the ceramic fiber composite according to the invention, with the range of 40 to 60 volume percent fiber content preferred.

Three types of fibers have been analyzed with the invention. The most extensively used were SiC based fibers (Nicalon fibers from Nippon Carbon) but some experiments were also conducted with an $Al_2O_3$ based (Sumitomo Chemical Company) and a graphite (Thornel P-100-Union Carbide Corp.) fiber. These fibers ranged from 5 to 10 microns in diameter. The $Al_2O_3$ based fibers were used both in the as-received and as-coated condition. The SiC fibers first had the polymer based sizing that they were received with burned off at approximately 600° C. prior to either their coating or their use uncoated in the composites. The fibers were coated by chemical vapor deposition using borazine as a source of BN at a temperature of 900°C. After coating, the tensile strength of the fibers was tested and their fracture mirrors determined. Matrices such as $SiO_2$, cordierite, mullite, and $ZrO_2$ were made using slips to infiltrate fiber tows, then subsequently hot pressed in the temperature range of 1350° to 1500° C. following uniaxial lay-up of the fiber tows. Some matrices such as $SiO_2$ and $ZrO_2$ were also fabricated by sol-gel processes followed by hot pressing as with the slip approach. SiC based matrices were processed by pyrolysis of a polysilane polymer with ~50% ceramic filler. Processing via polymer pyrolysis was carried out to a temperature 1000°C. This low processing temperature is what allowed the successful use of the $Al_2O_3$ based fibers in view of their exposure being limited to ~1200° C. to avoid substantial strength losses.

Specimens nominally 5 cm long by 65 mm by 2.2 mm in cross-section were fabricated by the above processes with the uniaxial fiber direction parallel with the bar length. After visual examination and measurement of archimedes density and open porosity, bars were mechanically tested at room temperature by 3 point flexure on a span of 1.9 cm i.e., giving a span to thickness ratio of ~9 to 1. Some specimens were also tested, again at room temperature, after furnace heating in air at 1000° C. for four hours. Subsequent to mechanical testing, some specimens that could be reasonably broken apart were broken for examination of fractures by scanning electron microscopy.

Figure 2:
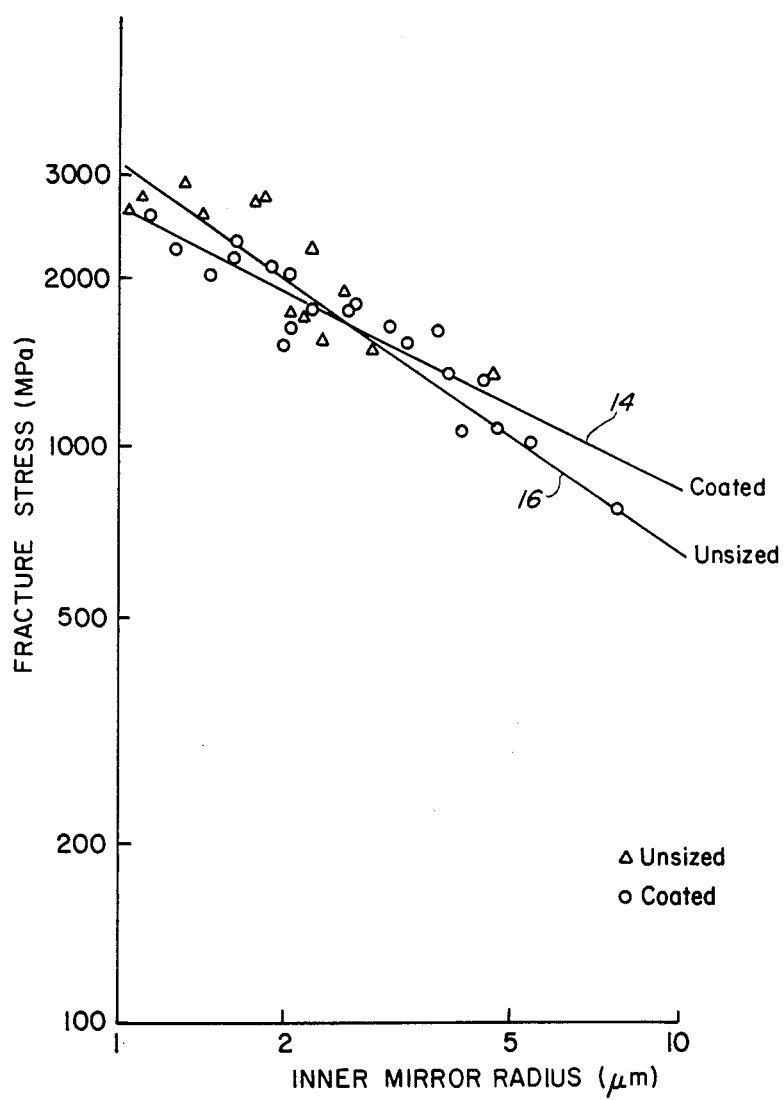
FIG. 2 is a graph showing fracture stress as a function of inner mirror radius of SiC fibers with and without a BN coating according to the present invention.

FIGS. 1 and 2 show the results of strength testing of SiC based fibers along with strength tests of similar uncoated SiC based fibers. Curve 10 in FIG. 1 indicates the probability of failure as a function of fracture stress for the SiC fibers with a BN coating. Curve 12 in FIG. 1 indicates the probability of failure for the same type of fibers uncoated. Curve 14 in FIG. 2 indicates the fracture stress as a function of inner mirror radius for the SiC fibers with a BN coating. Curve 16 in FIG. 2 indicates the fracture stress for the same type of fibers uncoated. Comparison of these results shows that there may be a limited amount of strength loss from coating the fibers (with ~0.1 μm thick coating) but this is statistically uncertain. The key point is that the coating process does not seriously degrade the strength of the fibers.

Figure 3:
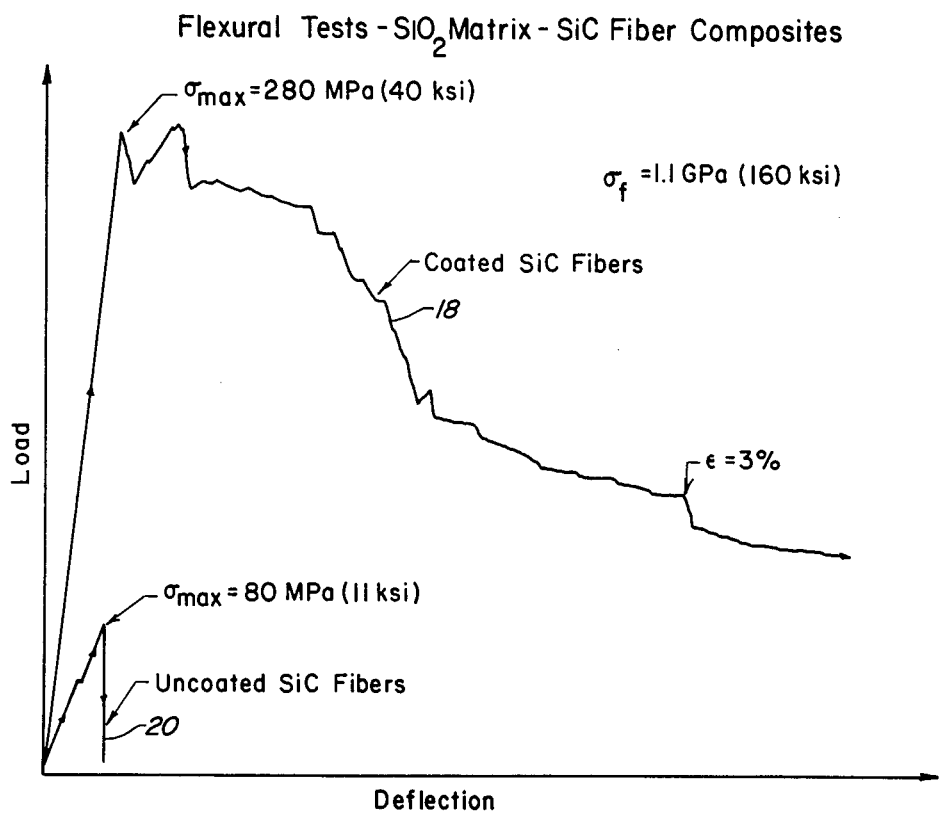
FIG. 3 is a graph showing load-deflection curves for both uncoated SiC fibers in an SiO$_2$ matrix and BN coated SiC fibers in the SiO$_2$ matrix according to the present invention.

A particularly dramatic affect of fiber coating on resultant mechanical behavior of fiber composites is shown in FIG. 3. Curve 18 in FIG. 3 indicates the load-deflection characteristics of a composite with BN coated SiC fibers in an $SiO_2$ matrix according to the present invention. Curve 20 in FIG. 3 indicates the load-deflection characteristics of a composite with the same type of SiC fibers uncoated in the $SiO_2$ matrix. Use of uncoated SiC based fibers in $SiO_2$ matrices has resulted in low strength composites which show completely catastrophic failure and hence no significant toughening. The lower load deflection in FIG. 3 is for such a brittle composite. The higher curve showing about four fold increase in strength and a very large increase in fracture toughness (as indicated by the area under the load deflection curve) results from an ~0.1 μm thickness of coating as the only significant difference between the two composites. In contrast to the very large effect of fiber coating on properties of composites with $SiO_2$ matrices, use of coated fibers in $ZrO_2$ matrices has resulted in little or no increase in the good strength and toughness achieved with uncoated fibers. On the other hand, attempts to process good cordierite based matrices by reaction of the constituents during hot pressing of the matrix has not been significantly more successful with fibers coated to ~0.1 μm thickness than with uncoated fibers, apparently due to attachment of the fiber through the coating or destruction of the coating by the matrix.

Use of coated SiC fibers in the polymer derived SiC matrix has yielded variable results. The best composites fabricated with uncoated SiC fibers have had strengths as high as or higher than the best of those achieved with coated fibers. However, use of coated fibers has generally yielded greater toughness as indicated by greater area under the load deflection curve, i.e., due to less rapid decrease in load bearing capabilities beyond the maximum load carrying capability, and use of coated fibers appears to more frequently give higher strengths. Thus, for example, the best strengths obtained to date by the polymer pyrolysis process with uncoated fibers is in the range of 330 Mpa ($48 \times 10^3$ psi); however, the strengths shown in Table I for uncoated fibers are more representative of present processing results and are more appropriately compared to the results with coated fibers since they represent the same processing.

Figure 4:
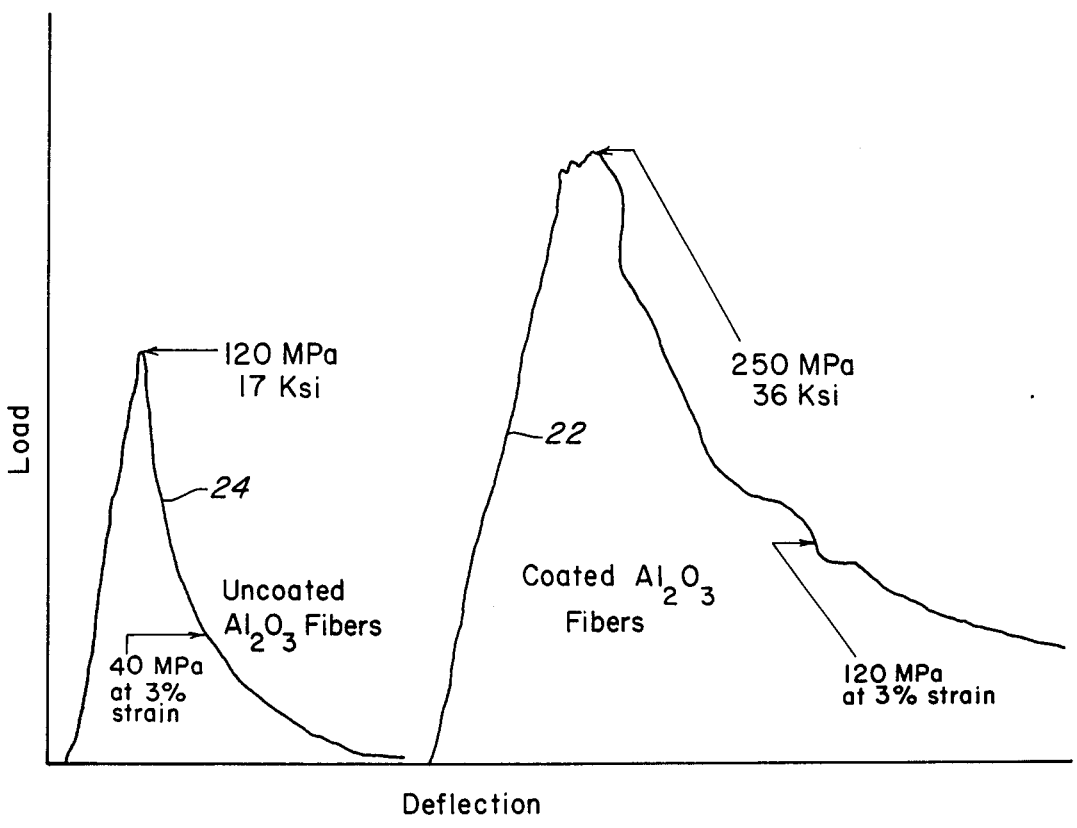
FIG. 4 is a graph showing load-deflection curves for both uncoated Al$_2$O$_3$ fibers in an SiC matrix and BN coated SiC fibers in the SiC matrix according to the present invention.

Composites processed using polymer pyrolysis with $Al_2O_3$ based fibers have also shown the clear advantage of using fiber coatings. Thus as outlined in Table I, and illustrated in FIG. 4, uncoated fibers gave moderate strengths of ~130 Mpa ($19 \times 10^3$ psi) and modest toughness as indicated by some limited load bearing capabilities past the maximum sustained load. On the other hand, use of fibers having a nominal coating of approximately 0.2 μm in thickness generally raised strengths, e.g., to ~250 Mpa ($36 \times 10^3$ psi) and significantly increased toughnesses as indicated by increased area under the load deflection curves, e.g., FIG. 4 and Table I. Curve 22 in FIG. 4 shows the load-deflection characteristics of a composite with BN coated Al₂O₃ based fibers in an SiC matrix. Curve 24 in FIG. 4 shows the load-deflection characteristics of a composite with the same type of Al₂O₃ fibers uncoated in the SiC matrix.

Figure 5:
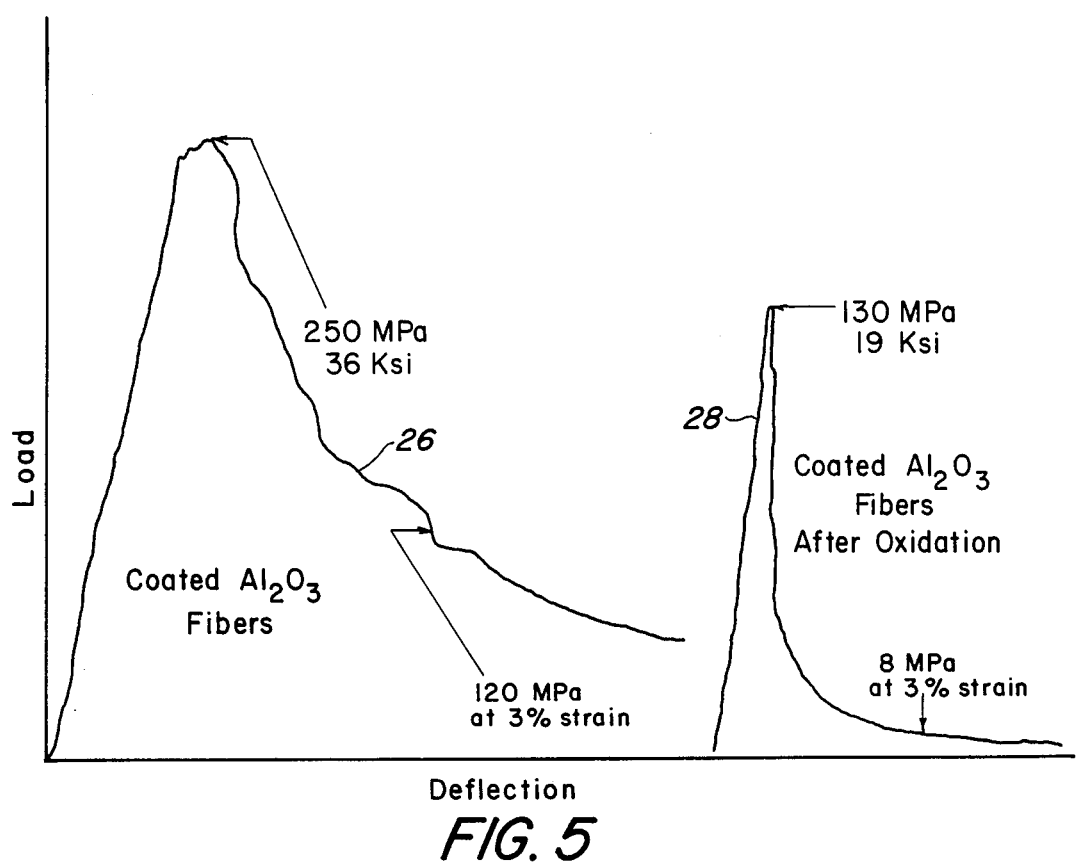
FIG. 5 is a graph showing a comparison of load-deflection curves for the BN coated Al$_2$O$_3$ fibers in the SiC matrix as shown in FIG. 4 both before and after exposure to high temperature oxidation.

Exposure of composites with open porosity to high temperature oxidizing conditions can lead to significant embrittlement. This is further illustrated in FIG. 5 and Table I. Curve 26 in FIG. 5 shows the load-deflection characteristics of a composite with BN coated AlO₃ fibers in an SiC matrix as indicated by Curve 22 in FIG. 4. Curve 28 shows the load-deflection characteristics of a composite with the same BN coated Al₂O₃ fibers in the SiC matrix after high temperature oxidation. Use of coated fibers has resulted in higher strength and higher toughness after oxidizing exposure than with uncoated fibers, e.g., as shown by contrasting the two specimens in FIG. 4.

Figure 6:
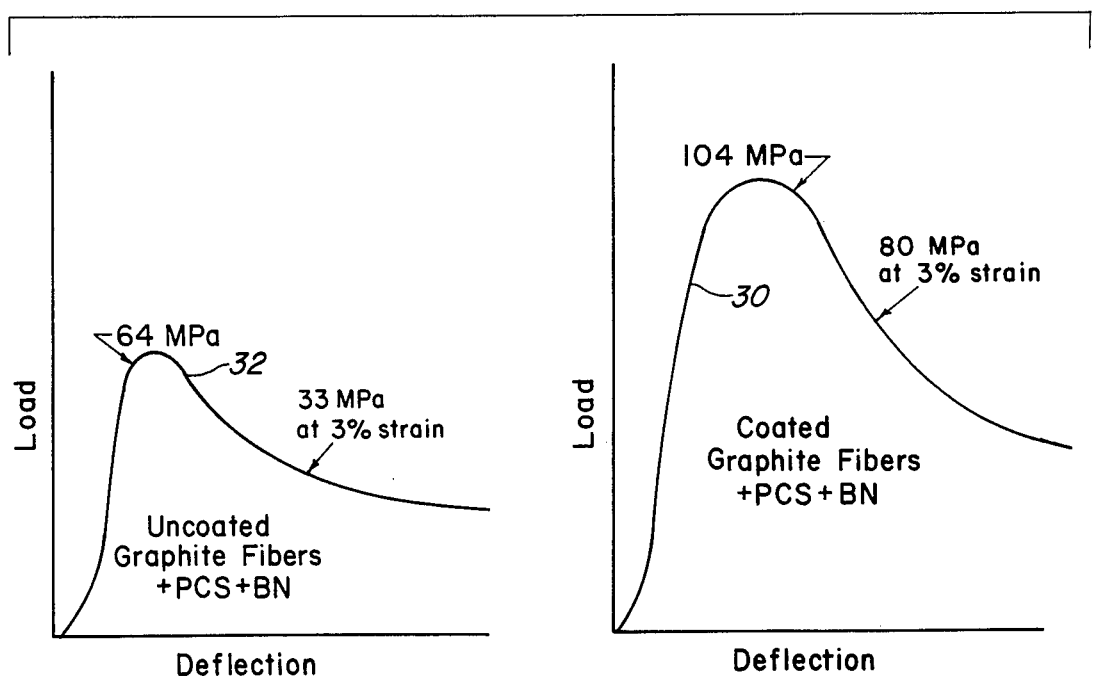
FIG. 6 is a graph showing load-deflection curves for both uncoated graphite fibers in an SiC matrix and BN coated graphite fibers in the SiC matrix according to the present invention.

Tests have also been made using graphite fibers in an SiC based matrix derived from pyrolysis of a polysilane polymer matrix (+ceramic filler). Representative results (FIG. 6) show that again both an increase in strength and toughness (as measured by area under the load-deflection curve) is obtained as a result of using the coating. Curve 30 in FIG. 6 indicates the load-deflection characteristics of a composite with BN coated graphite fibers in an SiC matrix. Curve 32 in FIG. 6 indicates the load-deflection characteristics of a composite with the same type of graphite fibers uncoated in the SiC matrix.

It will be understood that various changes in the details, materials and combinations of elements herein described in order to explain the nature of the invention may be made by those skilled in the art within the principle and scope of the invention as expressed in the appended claims.

a ceramic matrix encapsulating said plurality of coated fibers.

2. The ceramic fiber composite according to claim 1, wherein said composition further comprises at least a 30 percent of said plurality of coated fibers by volume.

3. The ceramic fiber composite according to claim 2, wherein said composition further comprises said plurality of coated fibers in the range of 40 to 60 percent by volume.

4. The ceramic fiber composite according to claim 3, wherein said composition further comprises said plurality of coated fibers with a coating thickness of at least 1 angstrom.

5. The ceramic fiber composite according to claim 4, wherein said composition further comprises said plurality of coated fibers with said coating thickness in the range of 0.05 to 0.3 micron.

6. The ceramic fiber composite according to claim 5, wherein said composition further comprises said plurality of coated fibers having thicknesses in the range of 1 to 150 microns.

7. The ceramic fiber composite according to claim 6, wherein said composition further comprises said plurality of fibers selected from the group of SiC, Al₂O₃, and graphite fibers.

8. The ceramic fiber composite according to claim 7, wherein said composition further comprises said ceramic matrix selected from the group of SiO₂, SiC, ZrO₂, ZrO₂-TiO₂, cordierite mullite and coated carbon matrices.

9. In a ceramic fiber composite, a composition comprising:
a plurality of ceramic fibers, selected from the group of SiC, Al₂O₃, and graphite fibers ranging from 5 to 10 microns in thickness;

TABLE I

PROPERTIES$^{(1)}$ OF CERAMIC FIBER COMPOSITES PROCESSED BY POLYMER PYROLYSIS
Composite Characterization:

| | | AS FABRICATED | | | AS OXIDIZED$^{(2)}$ | |
|---|---|---|---|---|---|---|
| | Fiber | V$_f$$^{(3)}$ (%) | Density (g/cm³) | Flexure Strength (MPa) | Density (g/cm³) | Flexure Strength (MPa) |
| (A) | SiC: | | | | | |
| | Uncoated | 40 | 1.83 | 103 ± 28 (2) | 1.83 | 78 ± 19 (5) |
| | | 70 | 1.88 | 185 ± 27 (2) | 1.88 | 141 (1) |
| | Coated | 70 | 1.86 | 211 ± 17 (4) | 1.86 | 57 (1) |
| | | 75 | 1.97 | 328 ± 87 (2) | 1.96 | 167 (1) |
| (B) | Al₂O₃: | | | | | |
| | Uncoated | 50 | 2.26 | 121 ± 13 (3) | 2.18 | 101 ± 6 (3) |
| | Coated | 60 | 2.16 | 249 ± 3 (2) | 2.15 | 130 ± 21 (3) |

$^{(1)}$All data from room temperature measurements. Standard deviations are shown where 2 or more strength measurements were made. The number of strength tests are shown in ( ).
$^{(2)}$Strength at room temperature after oxidation for 4 hours at 1000° C.
$^{(3)}$V$_f$ = Volume fraction of fibers.

WHAT IS CLAIMED AND DESIRED TO BE SECURED BY LETTERS PATENT OF THE UNITED STATES IS:

1. In a ceramic fiber composite, a composition comprising:
a plurality of ceramic fibers;
a fiber coating of boron nitride disposed over each fiber to form a plurality of coated fibers; and a fiber coating of boron nitride having a thickness in the range of 0.1 micron disposed over each fiber to form a plurality of coated fibers; and
a ceramic matrix selected from the group of SiO₂, SiC, ZrO₂, ZrO₂-TiO₂, mullite and coated carbon matrices encapsulating said plurality of coated fibers to form a composite having in the range of 40 to 60 percent of said coated fibers by volume.

* * * * *